United States Patent [19]

Berner et al.

[11] Patent Number: 4,612,049
[45] Date of Patent: Sep. 16, 1986

[54] CORROSION-INHIBITING COATING COMPOSITIONS

[75] Inventors: Godwin Berner, Binningen, Switzerland; William Hoyle; James Jack, both of Bramhall, England

[73] Assignee: Ciba-Geigy Corporation, Ardsley, N.Y.

[21] Appl. No.: 727,046

[22] Filed: Apr. 25, 1985

Related U.S. Application Data

[63] Continuation-in-part of Ser. No. 610,147, May 14, 1984.

[30] Foreign Application Priority Data

May 14, 1983 [GB] United Kingdom ............. 8313320

[51] Int. Cl.$^4$ ............................................. C04B 9/02
[52] U.S. Cl. ............................. 106/14.13; 106/14.16;
106/14.35; 106/14.37; 106/14.38; 252/391;
252/395; 427/385.5; 427/386; 427/388.1;
428/458; 428/460; 428/461; 524/83; 524/93
[58] Field of Search .................... 252/391, 395;
106/14.13, 14.16, 14.38, 14.42, 14.35, 14.37;
524/83, 93; 427/385.5, 386, 388.1; 428/458,
460, 461

[56] References Cited

U.S. PATENT DOCUMENTS

| | | | |
|---|---|---|---|
| 2,154,097 | 4/1937 | Loane | 252/391 |
| 4,066,462 | 1/1978 | Horiguchi | 106/14.34 |
| 4,329,381 | 5/1982 | Eschwey et al. | 427/386 |
| 4,400,365 | 8/1983 | Haacke et al. | 423/306 |
| 4,495,336 | 1/1985 | Hausler et al. | 252/855 |

FOREIGN PATENT DOCUMENTS 889380 2/1982 United Kingdom .

Primary Examiner—Lorenzo B. Hayes
Attorney, Agent, or Firm—Harry Falber

[57] ABSTRACT

A corrosion-inhibiting coating composition containing
(a) a film-former and
(b) as the corrosion inhibitor, an effective amount of an aliphatic or cycloaliphatic mono-, di-, tri- or tetra-carboxylic acid which is substituted in its aliphatic or cycloaliphatic radical by at least one group of the formula I

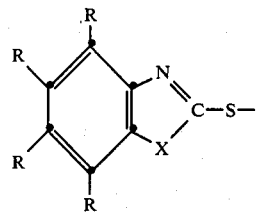

in which X is oxygen, sulfur or NH and each R independently of the others is hydrogen, alkyl, halogenoalkyl, alkoxy, alkylthio, alkylsulfonyl, cycloalkyl, phenyl, alkylphenyl, phenylalkyl, halogen, —CN, —NO$_2$, —COOH, —COOalkyl, —OH or a primary, secondary or tertiary amino or carbamoyl group, R not being —NH$_2$ in the case of a monocarboxylic acid in which X is sulfur, and also base addition salts of these compounds are useful as corrosion inhibitors.

22 Claims, No Drawings

CORROSION-INHIBITING COATING COMPOSITIONS

The present invention relates to coating compositions which, by virtue of containing certain compounds, are capable of inhibiting the corrosion of metallic substrates, especially ferrous metals. The compounds are aliphatic or cycloaliphatic carboxylic acids containing a heterocyclic radical.

Protection against corrosion is one of the most important duties of organic coating compositions for metal substrates. Many suggestions for improving the protection of coatings against corrosion are to be found in the literature, for example in H. Kittel, Lehrbuch der Lacke und Beschichtungen ("Textbook of Paints and Coatings"), volume V, Stuttgart 1977, 46-103. On the one hand, the barrier function of the coating composition can be improved, in order to keep corrosive agents, such as oxygen, water and ions, away from the metal surface. On the other hand, it is possible to employ corrosion-inhibiting pigments which intervene chemically or electrochemically in the corrosion process, for example by the formation of insoluble deposits with corrosion products or by passivation (polarisation) of the metal surface. Metal chromates and lead compounds rank amongst the most effective corrosion-inhibiting pigments. Much use has been made of metal chromates, particularly because they inhibit both anodic and cathodic corrosion. Nowadays there are certain objections to the use of chromates owing to their potential carcinogenic action. Similarly, there are objections to the use of lead compounds owing to their chronic toxicity.

Metal salts of organic compounds have also been frequently suggested as corrosion inhibitors. Thus, for example, European Patent Specification No. 3,817 recommends the use of zinc or lead salts of hydroxy or mercapto compounds of 5-membered or 6-membered heterocyclic compounds containing the characteristic group

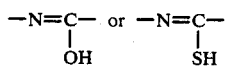

Typical examples of these are the Zn or Pb salts of 2-mercaptobenzthiazole.

It has now been found that certain heterocyclic carboxylic acids and salts thereof can be used as corrosion inhibitors for coating compositions, which makes it possible to formulate highly effective corrosion-inihibiting paints which are free from chromates and lead.

Organic corrosion inhibitors of this type are not pigments, and their use in coating compositions therefore permits a free choice of pigments or extenders. Organic corrosion inhibitors are known in the field of cooling water circulation systems or other aqueous systems, for example drilling and cutting fluids. Organic corrosion inhibitors are also used as additives for engine oils. In the field of coating compositions, however, there has hitherto been doubt whether the addition of organic corrosion inhibitors on their own makes possible adequate protection, in practice, against corrosion (Farbe und Lack 87 (1981) 787).

It is surprising, therefore, that the organic corrosion inhibitors according to the invention have a corrosion-inhibiting effect in coating compositions which is in certain cases equal to that of chromate or lead pigments, or even surpasses the latter.

The present invention relates, therefore, to a corrosion-inhibiting coating composition containing
 (a) a film-former and
 (b) as the corrosion inhibitor, an effective amount of an aliphatic or cycloaliphatic mono-, di-, tri- or tetracarboxylic acid which is substituted in its aliphatic or cycloaliphatic radical by at least one group of the formula I

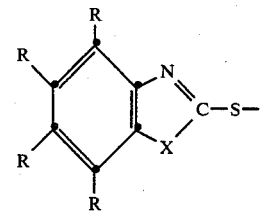

in which X is oxygen, sulfur or NH and each R independently of the others is hydrogen, alkyl, halogenoalkyl, alkoxy, alkylthio, alkylsulfonyl, cycloalkyl, phenyl, alkylphenyl, phenylalkyl, halogen, —CN, —NO$_2$, —COOH, —COOalkyl, —OH or a primary, secondary or tertiary amino or carbamoyl group, R not being —NH$_2$ in the case of a monocarboxylic acid in which X is sulfur, and also base addition salts of these compounds.

Depending on whether X is oxygen, sulfur or NH, these are derivatives of benzoxazole, benzthiazole or benzimidazole. The benzthiazole derivatives are preferred.

As alkyl, alkoxy, alkylthio or alkylsulfonyl, R preferably contains 1-12 C atoms, especially 1-6 C atoms. Examples of these are methyl, ethyl, propyl, isopropyl, n-butyl, isobutyl, tert.-butyl, pentyl, hexyl, octyl, nonyl, decyl, undecyl, dodecyl and the corresponding alkoxy, alkylthio and alkylsulfonyl radicals. As cycloalkyl, R preferably contains 5-8 C atoms. Examples of these are cyclopentyl, cyclohexyl or cyclooctyl.

As halogenoalkyl, R preferably contains 1-4 C atoms and 1-3 fluorine or chlorine atoms. Examples of these are chloromethyl, fluoromethyl, difluoromethyl, trifluoromethyl or 2-chloroethyl.

As alkylphenyl, R preferably contains 7-16 C atoms and can be, for example, tolyl, xylyl, 4-isopropylphenyl, 4-tert.-butylphenyl, 4-octylphenyl or 4-decylphenyl. As phenylalkyl, R preferably contains 7-9 C atoms and can be, for example, benzyl, 1-phenylethyl, 2-phenylethyl, α,α-dimethylbenzyl or 3-phenylpropyl.

As halogen, R is preferably fluorine, chlorine or bromine. If R is —COOalkyl, the alkyl group preferably has 1-4 C atoms.

As an amino group or carbamoyl group, R preferably has up to 20 C atoms. Examples of these are the groups —NH$_2$, —NHCH$_3$, —NHC$_{12}$H$_{15}$, —NH-cyclohexyl, —NH-phenyl, —N(CH$_3$)$_2$, —N(C$_4$H$_9$)$_2$, —N(CH$_3$)(benzyl), morpholino, piperidino, —CONH$_2$, —CONH-phenyl, —CONHC$_8$H$_{17}$, —CON(C$_2$H$_5$)$_2$, —CON(CH$_2$CH$_2$OH)$_2$, morpholinocarbonyl or piperidinocarbonyl.

Preferably, one of the substituents R is hydrogen, C$_1$-C$_4$-alkyl, C$_1$-C$_4$-alkoxy or an amino group, and the other three Rs are hydrogen. It is particularly preferable for all four Rs to be hydrogen.

The component (b) is preferably a monocarboxylic or dicarboxylic acid or a salt thereof, in particular a dicarboxylic acid or a salt thereof. The substituent of the formula I is preferably in the beta-position in relation to a carboxyl group.

The component (b) is preferably an aliphatic monocarboxylic or polycarboxylic acid which has 2–20 C atoms or a cycloaliphatic monocarboxylic or polycarboxylic acid which has 4–12, in particular 5–8, C atoms and which is substituted by a group of the formula I. In addition to the group of the formula I, the carboxylic acid can also have other substituents, for example hydroxyl, alkoxy, halogen or aryl.

Components (b) which are preferred are compounds of the formula II

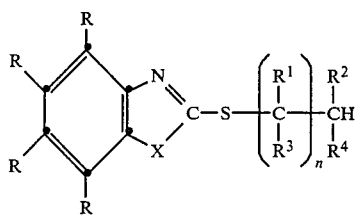

in which X and R have the meaning given above, n is zero or one and $R^1$, $R^2$, $R^3$ and $R^4$ independently of one another are hydrogen, alkyl, hydroxyalkyl, halogenoalkyl, alkoxyalkyl, carboxyalkyl, carboxyl or phenyl or phenylalkyl which is unsubstituted or monosubstituted or disubstituted, or $R^1$ and $R^2$ or $R^1$ and $R^3$ together are linear or branched alkylene which can be substituted by 1 or 2 carboxyl groups, or $R^1$ and $R^2$ together are a direct bond, and at least one of the substituents $R^1$, $R^2$, $R^3$ and $R^4$ is a carboxyl or carboxyalkyl group, and also base addition salts of these compounds. Therein n is preferable one.

As alkyl, $R^1$, $R^2$, $R^3$ and $R^4$ are preferably $C_1$–$C_{18}$-alkyl, for example methyl, ethyl, n-propyl, isopropyl, n-butyl, isobutyl, tert.-butyl, pentyl, hexyl, octyl, dodecyl or octadecyl. As hydroxyalkyl or halogenoalkyl, these substituents preferably have 1–4 C atoms. Examples of these are hydroxymethyl, 1-hydroxyethyl, 2-hydroxyethyl, 2-hydroxypropyl, 3-hydroxypropyl, chloromethyl, bromoethyl or bromoisopropyl. As alkoxyalkyl, these substituents preferably have 2–10 C atoms. Examples of these are methoxymethyl, 1-methoxyethyl, 2-ethoxypropyl, 1-methoxybutyl, n-butoxymethyl or 4-isopropoxybutyl.

As carboxyalkyl, $R^1$, $R^2$, $R^3$ and $R^4$ are preferably $C_2$–$C_{12}$-carboxyalkyl, for example carboxymethyl, 1-carboxyethyl, 2-carboxyethyl, 3-carboxypropyl, 2-carboxyisopropyl, 1-carboxybutyl, 2-carboxybutyl, 1-, 2- or 3-carboxyhexyl, 1,2-dicarboxyethyl or 2,3,4-tricarboxyl-1-butyl. As substituted or unsubstituted phenyl or phenylalkyl, the same substituents can be, for example, 4-chlorophenyl, 3-nitrophenyl, tolyl, xylyl, 3-methoxyphenyl, 4-isopropylphenyl, 3-carboxyethyl, 4-hydroxyphenyl, 4-bromobenzyl, 4-tert.-butylbenzyl, 2-phenylethyl or 3-phenylpropyl, but are preferably phenyl or benzyl.

If $R^1$ and $R^2$ or $R^1$ and $R^3$ together are alkylene, they form, together with the C atoms to which they are linked, a cycloalkane ring, preferably a cyclopentane or cyclohexane ring, which can be substituted by alkyl groups, preferably $C_1$–$C_4$-alkyl groups, or by 1 or 2 carboxyl groups.

If $R^1$ and $R^2$ together are a direct bond, the compounds of the formula II are unsaturated carboxylic acids.

$R^1$, $R^2$, $R^3$ and $R^4$ are preferably hydrogen, $C_1$–$C_4$-alkyl, carboxyl or $C_2$–$C_6$-carboxyalkyl. It is particularly preferable for $R^4$ to be a carboxyl group. Compounds of the formula II in which at least two of the substituents $R^1$, $R^2$, $R^3$ and $R^4$ are a carboxyl or carboxyalkyl group are also preferred.

Base addition salts are metal, ammonium or organic ammonium salts, in particular salts of alkali metals, alkaline earth metals, metals of the groups IIB, IIIA or VIII of the periodic system of the elements, ammonium salts or salts of organic amines. Examples of these are, in particular, sodium, potassium, calcium, magnesium, zinc, aluminium, ammonium, trialkylammonium and tris-(hydroxyethyl)ammonium salts.

The following are examples of corrosion inhibitors of the component (b):
benzthiazol-2-ylthioacetic acid,
5-carboxybenzthiazol-2-ylthioacetic acid,
3-(benzthiazol-2-ylthio)-propionic acid,
5-trifluoromethylbenzthiazol-2-ylthiopropionic acid,
4-(benzthiazol-2-ylthio)-butyric acid,
3-(benzthiazol-2-ylthio)-butyric acid,
3-(benzthiazol-2-ylthio)-3-methylbutyric acid,
benzthiazol-2-ylthiomalonic acid,
benzthiazol-2-ylthiosuccinic acid,
5-methylbenzthiazol-2-ylthiosuccinic acid,
6-ethylbenzthiazol-2-ylthiosuccinic acid,
4-isopropylbenzthiazol-2-ylthiosuccinic acid,
7-t-butylbenzthiazol-2-ylthiosuccinic acid,
5-n-hexylbenzthiazol-2-ylthiosuccinic acid,
6-(1,1,3,3-tetramethylbutyl)-benzthiazol-2-ylthiosuccinic acid,
6-cyclohexylbenzthiazol-2-ylthiosuccinic acid,
7-benzylbenzthiazol-2-ylthiosuccinic acid,
6-methoxybenzthiazol-2-ylthiosuccinic acid,
6-ethoxybenzthiazol-2-ylthiosuccinic acid,
7-ethoxybenzthiazol-2-ylthiosuccinic acid,
5-methoxybenzthiazol-2-ylthiosuccinic acid,
4-methylthiobenzthiazol-2-ylthiosuccinic acid,
4-fluorobenzthiazol-2-ylthiosuccinic acid,
5-chlorobenzthiazol-2-ylthiosuccinic acid,
7-bromobenzthiazol-2-ylthiosuccinic acid,
6-chlorobenzthiazol-2-ylthiosuccinic acid,
4-phenylbenzthiazol-2-ylthiosuccinic acid,
5-trifluoromethylbenzthiazol-2-ylthiosuccinic acid,
5-carboxybenzthiazol-2-ylthiosuccinic acid,
6-methylsulfonylbenzthiazol-2-ylthiosuccinic acid,
5-cyanobenzthiazol-2-ylthiosuccinic acid,
6-nitrobenzthiazol-2-ylthiosuccinic acid,
5-cyanobenzthiazol-2-ylthiosuccinic acid,
7-hydroxybenzthiazol-2-ylthiosuccinic acid,
6-chloro-4-methylbenzthiazol-2-ylthiosuccinic acid,
5-chloro-6-n-butylbenzthiazol-2-ylthiosuccinic acid,
4-bromo-5-n-hexylbenzthiazol-2-ylthiosuccinic acid,
5-nitro-6-n-propylbenzthiazol-2-ylthiosuccinic acid,
5-bromo-6-n-propoxybenzthiazol-2-ylthiosuccinic acid,
6-aminobenzthiazol-2-ylthiosuccinic acid,
6-methylaminobenzthiazol-2-ylthiosuccinic acid,
5-dimethylaminobenzthiazol-2-ylthiosuccinic acid,
7-phenylaminobenzthiazol-2-ylthiosuccinic acid,
6-diphenylaminobenzthiazol-2-ylthiosuccinic acid,
4-benzylaminobenzthiazol-2-ylthiosuccinic acid,
4-morpholinobenzthiazol-2-ylthiosuccinic acid,
5-carbamoylbenzthiazol-2-ylthiosuccinic acid,
5-methylcarbamoylbenzthiazol-2-ylthiosuccinic acid, 5-diethylcarbamoylbenzthiazol-2-ylthiosuccinic acid,
6-phenylcarbamoylbenzthiazol-2-ylthiosuccinic acid,
5,6-dimethylbenzthiazol-2-ylthiosuccinic acid,
4,5,6-triethylbenzthiazol-2-ylthiosuccinic acid,
4,5,6,7-tetramethylbenzthiazol-2-ylthiosuccinic acid,
1-(benzthiazol-2-ylthio)-propane-1,2-dicarboxylic acid,
3-(benzthiazol-2-ylthio)-propane-1,2-dicarboxylic acid,
3-(6-trifluoromethylbenzthiazol-2-ylthio)-propane-1,2-dicarboxylic acid,
3-(6-methoxycarbonylbenzthiazol-2-ylthio)-propane-1,2-dicarboxylic acid,
3-(6-aminobenzthiazol-2-ylthio)-propane-1,2-dicarboxylic acid,
3-(5-ethylaminobenzthiazol-2-ylthio)-propane-1,2-dicarboxylic acid,
3-(4-dibutylaminobenzthiazol-2-ylthio)-propane-1,2-dicarboxylic acid,
4-(morpholinobenzthiazol-2-ylthio)-propane-1,2-dicarboxylic acid,
1-(4-phenylbenzthiazol-2-ylthio)-propane-1,2-dicarboxylic acid,
1-(benzthiazol-2-ylthio)-propane-1,3-dicarboxylic acid,
1-(6-ethylbenzthiazol-2-ylthio)-propane-1,3-dicarboxylic acid,
2-(benzthiazol-2-ylthio)-propane-1,3-dicarboxylic acid,
2-(5-carboxybenzthiazol-2-ylthio)-propane-1,3-dicarboxylic acid,
3-(benzthiazol-2-ylthio)-3-phenylpropane-1,2-dicarboxylic acid,
3-(benzthiazol-2-ylthio)-3-(4-carboxyphenyl)-propane-1,2-dicarboxylic acid,
3-(benzthiazol-2-ylthio)-3-(2,4-dicarboxylphenyl)-propane-1,2-dicarboxylic acid,
3-(benzthiazol-2-ylthio)-3,3-diphenylpropane-1,2-dicarboxylic acid,
1-(benzthiazol-2-ylthio)-butane-1,2-dicarboxylic acid,
1-(4-methoxy-6-hydroxybenzthiazol-2-ylthio)-butane-1,2-dicarboxylic acid,
3-(4,5-dimethyl-7-propoxybenzthiazol-2-ylthio)-propane-1,2-dicarboxylic acid,
1-(benzthiazol-2-ylthio)-2-methylpropane-1,2-dicarboxylic acid,
2-(benzthiazol-2-ylthio)-butane-2,3-dicarboxylic acid,
1-(benzthiazol-2-ylthio)-butane-2,4-dicarboxylic acid,
4-(benzthiazol-2-ylthio)-butane-1,2,3-tricarboxylic acid,
4-(benzthiazol-2-ylthio-butane-1,4-dicarboxylic acid,
1-(benzthiazol-2-ylthio,-pentane-1,5-dicarboxylic acid,
3-(benzthiazol-2-ylthio)-hexane-1,2-dicarboxylic acid,
8-(benzthiazol-2-ylthio)-octane-1,3,5,7-tetracarboxylic acid,
1-(benzthiazol-2-ylthio)-cyclohexane-1,2-dicarboxylic acid,
4-(benzthiazol-2-ylthio)-cyclohexane-1,2-dicarboxylic acid,
1-(benzthiazol-2-ylthio)-propane-1,2,3-tricarboxylic acid,
1-(benzthiazol-2-ylthio)-3-chloropropane-1,2-dicarboxylic acid,
1-(benzthiazol-2-ylthio)-3-methoxypropane-1,2-dicarboxylic acid,
1-(benzthiazol-2-ylthio)-3-hydroxypropane-1,2-dicarboxylic acid,
1-(benzthiazol-2-ylthio)-2-phenylsuccinic acid,
1-(benzthiazol-2-ylthio)-2-benzylsuccinic acid,
1-(benzthiazol-2-ylthio)-3-methylbutane-1,3-dicarboxylic acid,
3-(benzthiazol-2-ylthio)-hexane-3,4-dicarboxylic acid,
2,3-bis-(benzthiazol-2-ylthio)-butane-1,4-dicarboxylic acid,
disodium benzthiazol-2-ylthiosuccinate,
dipotassium benzthiazol-2-ylthiosuccinate,
calcium benzthiazol-2-ylthiosuccinate,
zinc benzthiazol-2-ylthiosuccinate,
cobalt benzthiazol-2-ylthiosuccinate,
aluminium benzthiazol-2-ylthiosuccinate,
ammonium benzthiazol-2-ylthiosuccinate,
bis-methylammonium benzthiazol-2-ylthiosuccinate,
bis-triethanolammonium benzthiazol-2-ylthiosuccinate,
bis-octylammonium benzthiazol-2-ylthiosuccinate,
bis-cyclohexylammonium benzthiazol-2-ylthiosuccinate,
diethylammonium benzthiazol-2-ylthiosuccinate,
tributylammonium benzthiazol-2-ylthiosuccinate,
disodium 3-(benzthiazol-2-ylthio)-propane-1,2-dicarboxylate,
dipotassium 3-(benzthiazol-2-ylthio)-propane-1,2-dicarboxylate,
calcium 3-(benzthiazol-2-ylthio)-propane-1,2-dicarboxylate,
zinc 3-(benzthiazol-2-ylthio)-propane-1,2-dicarboxylate,
aluminium 3-(benzthiazol-2-ylthio)-propane-1,2-dicarboxylate,
ammonium 3-(benzthiazol-2-ylthio)-propane-1,2-dicarboxylate,
bis-methylammonium 3-(benzthiazol-2-ylthio)-propane-1,2-dicarboxylate,
bis-(triethanolammonium) 3-(benzthiazol-2-ylthio)-propane-1,2-dicarboxylate,
benzoxazol-2-ylthioacetic acid,
5-trifluoromethylbenzoxazol-2-ylthioacetic acid,
5-carboxybenzoxazol-2-ylthioacetic acid,
5-ethoxycarbonylbenzoxazol-2-ylthioacetic acid,
6-methylsulfonylbenzoxazol-2-ylthioacetic acid,
6-aminobenzoxazol-2-ylthioacetic acid,
3-(benzoxazol-2-ylthio)-propionic acid,
4-(benzoxazol-2-ylthio)-butyric acid,
3-(benzoxazol-2-ylthio)-butyric acid,
3-(benzoxazol-2-ylthio)-3-methylbutyric acid,
benzoxazol-2-ylthiomalonic acid,
benzoxazol-2-ylthiosuccinic acid,
5-methylbenzoxazol-2-ylthiosuccinic acid,
6-ethylbenzoxazol-2-ylthiosuccinic acid,
4-isopropylbenzoxazol-2-ylthiosuccinic acid,
7-t-butylbenzoxazol-2-ylthiosuccinic acid,
5-n-hexylbenzoxazol-2-ylthiosuccinic acid,
6-[1,1,3,3-tetramethylbutyl]-benzoxazol-2-ylthiosuccinic acid,
6-cyclohexylbenzoxazol-2-ylthiosuccinic acid,
7-benzylbenzoxazol-2-ylthiosuccinic acid,
6-methoxybenzoxazol-2-ylthiosuccinic acid,
7-ethoxybenzoxazol-2-ylthiosuccinic acid,
6-ethoxybenzoxazol-2-ylthiosuccinic acid,
5-methoxybenzoxazol-2-ylthiosuccinic acid,
5-ethoxycarbonylbenzoxazol-2-ylthiosuccinic acid,
4-methylthiobenzoxazol-2-ylthiosuccinic acid,
6-methylsulfonylbenzoxazol-2-ylthiosuccinic acid,
4-fluorobenzoxazol-2-ylthiosuccinic acid,
5-chlorobenzoxazol-2-ylthiosuccinic acid,
7-bromobenzoxazol-2-ylthiosuccinic acid,
6-chlorobenzoxazol-2-ylthiosuccinic acid,
4-phenylbenzoxazol-2-ylthiosuccinic acid,
6-nitrobenzoxazol-2-ylthiosuccinic acid,
5-cyanobenzoxazol-2-ylthiosuccinic acid,
5-carboxybenzoxazol-2-ylthiosuccinic acid, 7-hydroxybenzoxazol-2-ylthiosuccinic acid,
6-chloro-4-methylbenzoxazol-2-ylthiosuccinic acid,
5-chloro-6-n-butylbenzoxazol-2-ylthiosuccinic acid,
4-bromo-5-n-hexylbenzoxazol-2-ylthiosuccinic acid,
5-nitro-6-n-propylbenzoxazol-2-ylthiosuccinic acid,
5-bromo-6-n-propoxybenzoxazol-2-ylthiosuccinic acid,
6-aminobenzoxazol-2-ylthiosuccinic acid,
6-methylaminobenzoxazol-2-ylthiosuccinic acid,
5-dimethylaminobenzoxazol-2-ylthiosuccinic acid,
7-phenylaminobenzoxazol-2-ylthiosuccinic acid,
6-diphenylaminobenzoxazol-2-ylthiosuccinic acid,
4-benzylaminobenzoxazol-2-ylthiosuccinic acid,
4-morpholinobenzoxazol-2-ylthiosuccinic acid,
5-carbamoylbenzoxazol-2-ylthiosuccinic acid,
5-methylcarbamoylbenzoxazol-2-ylthiosuccinic acid,
5-diethylcarbamoylbenzoxazol-2-ylthiosuccinic acid,
6-phenylcarbamoylbenzoxazol-2-ylthiosuccinic acid,
5,6-dimethylbenzoxazol-2-ylthiosuccinic acid,
4,5,6-triethylbenzoxazol-2-ylthiosuccinic acid,
4,5,6,7-tetramethylbenzoxazol-2-ylthiosuccinic acid,
1-(benzoxazol-2-ylthio)-propane-1,2-dicarboxylic acid,
1-(4-phenylbenzoxazol-2-ylthio)-propane-1,2-dicarboxylic acid,
3-(benzoxazol-2-ylthio)-propane-1,2-dicarboxylic acid,
3-(6-trifluoromethylbenzoxazol-2-ylthio)-propane-1-2-dicarboxylic acid,
3-(6-methoxycarbonylbenzoxazol-2-ylthio)-propane-1,2-dicarboxylic acid,
3-(6-aminobenzoxazol-2-ylthio)-propane-1,2-dicarboxylic acid,
3-(5-ethylaminobenzoxazol-2-ylthio)-propane-1,2-dicarboxylic acid,
3-(4-dibutylaminobenzoxazol-2-ylthio)-propane-1,2-dicarboxylic acid,
4-(morpholinobenzoxazol-2-ylthio)-propane-1,2-dicarboxylic acid,
1-(benzoxazol-2-ylthio)-propane-1,3-dicarboxylic acid,
1-(6-ethylbenzoxazol-2-ylthio)-propane-1,3-dicarboxylic acid,
2-(benzoxazol-2-ylthio)-propane-1,3-dicarboxylic acid,
2-(5-carboxybenzoxazol-2-ylthio)-propane-1,3-dicarboxylic acid,
3-(benzoxazol-2-ylthio)-3-phenylpropane-1,2-dicarboxylic acid,
3-(benzoxazol-2-ylthio)-3-(4-carboxyphenyl)-propane-1,2-dicarboxylic acid,
3-(benzoxazol-2-ylthio)-3-(2,4-dicarboxyphenyl)-propane-1,2-dicarboxylic acid,
3-(benzoxazol-2-ylthio)-3,3-diphenylpropane-1,2-dicarboxylic acid,
1-(benzoxazol-2-ylthio)-butane-1,2-dicarboxylic acid,
1-(4-methoxy-6-hydroxybenzoxazol-2-ylthio)-butane-1,2-dicarboxylic acid,
3-(4,5-dimethyl-7-propoxybenzoxazol-2-ylthio)-propane-1,2-dicarboxylic acid,
1-(benzoxazol-2-ylthio)-2-methylpropane-1,2-dicarboxylic acid,
2-(benzoxazol-2-ylthio)-butane-2,3-dicarboxylic acid,
1-(benzoxazol-2-ylthio)-butane-2,4-dicarboxylic acid,
4-(benzoxazol-2-ylthio)-butane-1,2,3-tricarboxylic acid,
4-(benzoxazol-2-ylthio)-butane-1,4-dicarboxylic acid,
1-(benzoxazol-2-ylthio)-pentane-1,5-dicarboxylic acid,
3-(benzoxazol-2-ylthio)-hexane-1,2-dicarboxylic acid,
8-(benzoxazol-2-ylthio)-octane-1,3,5,7-tetracarboxylic acid,
1-(benzoxazol-2-ylthio)-cyclohexane-1,2-dicarboxylic acid,
4-(benzoxazol-2-ylthio)-cyclohexane-1,2-dicarboxylic acid,
1-(benzoxazol-2-ylthio)-propane-1,2,3-tricarboxylic acid,
1-(benzoxazol-2-ylthio)-3-chloropropane-1,2-dicarboxylic acid,
1-(benzoxazol-2-ylthio)-3-methoxypropane-1,2-dicarboxylic acid,
1-(benzoxazol-2-ylthio)-3-hydroxypropane-1,2-dicarboxylic acid,
1-(benzoxazol-2-ylthio)-2-phenylsuccinic acid,
1-(benzoxazol-2-ylthio)-2-benzylsuccinic acid,
1-(benzoxazol-2-ylthio)-3-methylbutane-1,3-dicarboxylic acid,
3-(benzoxazol-2-ylthio)-hexane-3,4-dicarboxylic acid,
2,3-bis-(benzoxazol-2-ylthio)-butane-1,4-dicarboxylic acid,
disodium benzoxazol-2-ylthiosuccinate,
dipotassium benzoxazol-2-ylthiosuccinate,
calcium benzoxazol-2-ylthiosuccinate,
zinc benzoxazol-2-ylthiosuccinate,
cobalt benzoxazol-2-ylthiosuccinate,
ammonium benzoxazol-2-ylthiosuccinate,
bis-methylammonium benzoxazol-2-ylthiosuccinate,
bis-triethanolammonium benzoxazol-2-ylthiosuccinate,
bis-octylammonium benzoxazol-2-ylthiosuccinate,
bis-cyclohexylammonium benzoxazol-2-ylthiosuccinate,
diethylammonium benzoxazol-2-ylthiosuccinate,
tributylammonium benzoxazol-2-ylthiosuccinate,
disodium 3-(benzoxazbl-2-ylthio)-propane-1,2-dicarboxylate,
dipotassium 3-(benzoxazol-2-ylthio)-propane-1,2-dicarboxylate,
calcium 3-(benzoxazol-2-ylthio)-propane-1,2-dicarboxylate,
zinc 3-(benzoxazol-2-ylthio)-propane-1,2-dicarboxylate,
ammonium 3-(benzoxazol-2-ylthio)-propane-1,2-dicarboxylate,
bis-methylammonium 3-(benzoxazol-2-ylthio)-propane-1,2-dicarboxylate,
bis-triethanolammonium 3-(benzoxazol-2-ylthio)-propane-1,2-dicarboxylate,
benzimidazol-2-ylthioacetic acid,
5-trifluoromethylbenzimidazol-2-ylthioacetic acid,
5-carboxybenzimidazol-2-ylthioacetic acid,
5-ethoxycarbonylbenzimidazol-2-ylthioacetic acid,
6-methylsulphonylbenzimidazol-2-ylthioacetic acid,
6-aminobenzimidazol-2-ylthioacetic acid,
3-(benzimidazol-2-ylthio)-propionic acid,
4-(benzimidazol-2-ylthio)-butyric acid,
3-(benzimidazol-2-ylthio)-butyric acid,
3-(benzimidazol-2-ylthio)-3-methylbutyric acid,
benzimidazol-2-ylthiomalonic acid,
benzimidazol-2-ylthiosuccinic acid,
5 (or 6)-methylbenzimidazol-2-ylthiosuccinic acid,
6 (or 5)-ethylbenzimidazol-2-ylthiosuccinic acid,
4 (or 7)-isopropylbenzimidazol-2-ylthiosuccinic acid,
7 (or 4)-t-butylbenzimidazol-2-ylthiosuccinic acid,
5 (or 6)-hexylbenzimidazol-2-ylthiosuccinic acid,
6 (or 5)-[1,1,3,3-tetramethylbutyl]-benzimidazol-2-ylthiosuccinic acid,
7 (or 4)-benzylbenzimidazol-2-ylthiosuccinic acid,
6 (or 5)-methoxybenzimidazol-2-ylthiosuccinic acid,
5-ethoxycarbonylbenzimidazol-2-ylthiosuccinic acid,
6 (or 5)-ethoxybenzimidazol-2-ylthiosuccinic acid,
7 (or 4)-ethoxybenzimidazol-2-ylthiosuccinic acid,
4 (or 7)-fluorobenzimidazol-2-ylthiosuccinic acid, 5 (or 6)-chlorobenzimidazol-2-ylthiosuccinic acid,
7 (or 4)-bromobenzimidazol-2-ylthiosuccinic acid,
6 (or 5)-nitrobenzimidazol-2-ylthiosuccinic acid,
5 (or 6)-methylsulphonylbenzimidazol-2-ylthiosuccinic acid,
1-(benzimidazol-2-ylthio)-2-phenylsuccinic acid,
5 (or 6)-chloro-4 (or 7)-methylbenzimidazol-2-ylthiosuccinic acid,
5 (or 6)-chloro-6 (or 5)-n-butylbenzimidazol-2-ylthiosuccinic acid,
4 (or 7)-bromo-5 (or 6)-n-hexylbenzimidazol-2-ylthiosuccinic acid,
5 (or 6)-nitro-6 (or 5)-n-propylbenzimidazol-2-ylthiosuccinic acid,
5 (or 6)-bromo-6 (or 5)-n-propoxybenzimidazol-2-ylthiosuccinic acid,
5,6-dimethylbenzimidazol-2-ylthiosuccinic acid,
4,5,6-triethylbenzimidazol-2-ylthiosuccinic acid,
4,5,6,7-tetramethylbenzimidazol-2-ylthiosuccinic acid,
5 (or 6)-aminobenzimidazol-2-ylthiosuccinic acid,
(1- benzimidazol-2-ylthio)-propane-1,2-dicarboxylic acid,
1-(4 (or 7)-phenylbenzimidazol-2-ylthio)-propane-1,2-dicarboxylic acid,
1-(benzimidazol-2-ylthio)-propane-1,3-dicarboxylic acid,
1-(6 (or 5)-ethylthiobenzimidazol-2-ylthio)-propane-1,3-dicarboxylic acid,
2-(benzimidazol-2-ylthio)-propane-1,3-dicarboxylic acid,
2-(5 (or 6)-carboxybenzimidazol-2-ylthio)-propane-1,3-dicarboxylic acid,
3-(benzimidazol-2-ylthio)-propane-1,2-dicarboxylic acid,
3-(5 (or 6)-aminobenzimidazol-2-ylthio)-propane-1,2-dicarboxylic acid,
3-(5 (or 6)-ethoxycarbonylbenzimidazol-2-ylthio)-propane-1,2-dicarboxylic acid,
3-(5 (or 6)-trifluoromethylbenzimidazol-2-ylthio)-propane-1,2-dicarboxylic acid,
3-(4 (or 7)-dipropylaminobenzimidazol-2-ylthio)-propane-1,2-dicarboxylic acid,
3-(4 (or 7)-morpholinobenzimidazol-2-ylthio)-propane-1,2-dicarboxylic acid,
3-(5 (or 6)-carbamoylbenzimidazol-2-ylthio)-propane-1,2-dicarboxylic acid,
3-(4 (or 7)-cyanobenzimidazol-2-ylthio)-propane-1,2-dicarboxylic acid,
3-(benzimidazol-2-ylthio)-3-phenylpropane-1,2-dicarboxylic acid,
3-(benzimidazol-2-ylthio)-3-(4-carboxyphenyl)-propane-1,2-dicarboxylic acid,
3-(benzimidazol-2-ylthio)-3-(2,4-dicarboxyphenyl)-propane-1,2-dicarboxylic acid,
3-(benzimidazol-2-ylthio)-3,3-diphenylpropane-1,2-dicarboxylic acid,
1-(benzimidazol-2-ylthio)-butane-1,2-dicarboxylic acid,
1-(4 (or 7)-methoxy-6 (or 5)-hydroxybenzimidazol-2-ylthio)butane-1,2-dicarboxylic acid,
4-(benzimidazol-2-ylthio)-butane-1,2,3-tricarboxylic acid,
1-(4 (or 7)-methyl-7 (or 4)-propoxybenzimidazol-2-ylthio)-propane-2,3-dicarboxylic acid,
1-(benzimidazol-2-ylthio)-2-methylpropane-1,2-dicarboxylic acid,
2-(benzimidazol-2-ylthio)-butane-2,3-dicarboxylic acid,
1-(benzimidazol-2-ylthio)-butane-2,4-dicarboxylic acid,
4-(benzimidazol-2-ylthio)-butane-1,4-dicarboxylic acid,
1-(benzimidazol-2-ylthio)-pentane-1,5-dicarboxylic acid,
3-(benzimidazol-2-ylthio)-hexane-1,2-dicarboxylic acid,
8-(benzimidazol-2-ylthio)-octane-1,3,5,7-tetracarboxylic acid,
1-(benzimidazol-2-ylthio)-cyclohexane-1,2-dicarboxylic acid,
4-(benzimidazol-2-ylthio)-cyclohexane-1,2-dicarboxylic acid,
1-(benzimidazol-2-ylthio)-propane-1,2,3-tricarboxylic acid,
1-(benzimidazol-2-ylthio)-3-chloropropane-1,2-dicarboxylic acid,
1-(benzimidazol-2-ylthio)-3-methoxypropane-1,2-dicarboxylic acid,
1-(benzimidazol-2-ylthio)-3-hydroxypropane-1,2-dicarboxylic acid,
1-(benzimidazol-2-ylthio)-3-methylbutane-1,3-dicarboxylic acid,
3-(benzimidazol-2-ylthio)-hexane-3,4-dicarboxylic acid,
disodium benzimidazol-2-ylthiosuccinate,
dipotassium benzimidazol-2-ylthiosuccinate,
calcium benzimidazol-2-ylthiosuccinate,
zinc benzimidazol-2-ylthiosuccinate,
cobalt benzimidazol-2-ylthiosuccinate,
ammonium benzimidazol-2-ylthiosuccinate,
bis-methylammonium benzimidazol-2-ylthiosuccinate,
bis-triethanolammonium benzimidazol-2-ylthiosuccinate,
bis-octylammonium benzimidazol-2-ylthiosuccinate,
bis-cyclohexylammonium benzimidazol-2-ylthiosuccinate and
diethylammonium benzimidazol-2-ylthiosuccinate.

The solubility in water of the corrosion inhibitors (b) according to the invention should preferably be less than 400 mg/liter.

Some of the compounds of the formula II which are used in accordance with the invention as corrosion inhibitors are known compounds; others are novel compounds. The preparation of the compounds can be effected in accordance with a process which is the subject of a separate patent application, by reacting a compound of the formula III

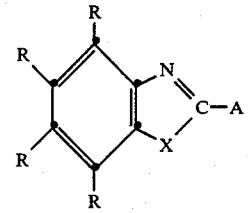

in which A is a leaving group, for example Cl, Br, I or p-tosyloxy, with a compound of the formula

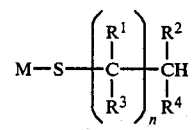

in which M is hydrogen or a cation, for example an alkali metal cation, alkaline earth metal cation or ammonium cation. Alternatively, a compound of the formula IV

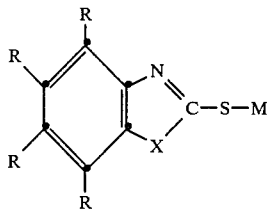

IV can be reacted with a compound of the formula

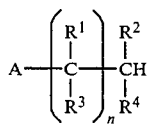

Compounds of the formula II in which X is sulfur or NH and $R^4$ is carboxyl can also be prepared by reacting IV, in which M is hydrogen and X is S or NH, with an α, β-unsaturated acid of the formula

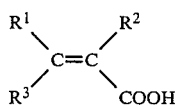

in accordance with a process which is the subject of a separate patent application.

The component (a) can be any desired film-former, such as those which are known as binders for coating compositions. In particular, it can be an epoxide resin, polyurethane resin, aminoplast resin, acrylic resin, polyester resin, alkyd resin or a mixture of such resins. Further examples of suitable binders are vinyl resins, such as polyvinyl butyral, polyvinyl acetate or polyvinyl chloride or copolymers thereof, phenolic resins, chlorinated rubbers, styrene/butadiene copolymers, drying oils or cellulose esters.

The film-forming component (a) may be a solution of the binder resin in an organic solvent, it may be an aqueous solution or dispersion or it may be a solid powder. Of special industrial importance are "high solids coatings" containing a limited amount of organic solvent.

Suitable epoxide resins are those which have on average more than one epoxide group per molecule, for example bis-(2,3-epoxycyclohexyl) ether, 4-epoxyethylcyclohexene oxide or the 2-methyl-4,5-epoxycyclohexylmethyl ester of 2-methyl-4,5-epoxycyclohexanecarboxylic acid; diglycidyl and polyglycidyl esters of aliphatic polyols, for example 1,4-butanediol or polyalkylene glycols; diglycidyl or polyglycidyl ethers of cycloaliphatic polyols, for example 2,2-bis-(4-hydroxycyclohexyl)-propane; diglycidyl and polyglycidyl ethers of aromatic polyols, for example resorcinol, bis-(4-hydroxyphenyl)-methane, 2,2-bis-(4-hydroxyphenyl)-propane, 2,2-bis-(4-hydroxy-3,5-dibromophenyl)-propane, 1,1,2,2-tetrakis-(4-hydroxyphenyl)-ethane or condensation products of phenols with formaldehyde, such as phenol or cresol novolacs; β-methylglycidyl ethers of polyols; glycidyl esters of polybasic carboxylic acids, for example phthalic, terephthalic, tetrahydrophthalic or hexahydrophthalic acid; N-glycidyl derivatives of amines, amides or nitrogen-heterocyclic compounds, for example N,N-diglycidylaniline, N,N-diglycidyltoluidine or N,N,N',N'-tetraglycidyl-bis-(4-aminophenyl)-methane, triglycidyl isocyanurate, N,N'-diglycidylethyleneurea, N,N'-diglycidyl-5,5-diethylhydantoin; N,N'-diglycidyl-5-isopropylhydantoin or N,N'-diglycidyl-5,5-dimethyl-6-isopropyl-5,6-dihydrouracil.

Preferred epoxide resins are those based on aromatic polyols, in particular bisphenols. The epoxide resins are used in conjunction with a curing agent. The latter can be, in particular, an amino or hydroxy compound or an acid or an acid anhydride or a Lewis acid. Examples of these are polyamines, polyaminoamides, polysulfide polymers, polyphenols, boron fluoride and complexes thereof, polycarboxylic acids, 1,2-dicarboxylic acid anhydrides or pyromellitic dianhydride.

In addition to the components (a) and (b), the coating composition can also contain further components, for example pigments, dyes, extenders and other additives such as are customary for coating compositions. The pigments can be organic, inorganic or metallic pigments, for example titanium dioxide, iron oxide, aluminium bronze, phthalocyanine blue etc. It is also possible to use concomitantly anti-corrosion pigments, for example pigments containing phosphates or borates, metal pigments and metal oxide pigments (see Farbe und Lack 88 (1982), 183) or the pigments described in European Pat. No. A 54,267. Examples of extenders which can be used concomitantly are talc, chalk, alumina, baryte, mica or silica. Examples of further additives are flow control auxiliaries, dispersing agents, thixotropic agents, adhesion promoters, antioxidants, light stabilisers or curing catalysts.

Particular importance attaches to the addition of basic extenders or pigments. In certain binder systems, for example in acrylic and alkyd resins, these produce a synergistic effect on the inhibition of corrosion. Examples of such basic extenders or pigments are calcium carbonate, magnesium carbonate, zinc oxide, zinc carbonate, zinc phosphate, magnesium oxide, aluminium oxide, aluminium phosphate or mixtures thereof. Examples of pigments are those based on aminoanthraquinone.

The corrosion inhibitors according to the invention can also first be applied to such basic extenders or pigments, for example by chemisorption from an aqueous solution, and the preparations thus obtained can be added to the coating composition.

In a further preferred embodiment of the invention the corrosion inhibitors are used together with basic ion exchangers or an ion exchanger of this type is first treated with a solution of the inhibitor, and this preparation is then added to the coating composition. Examples of basic ion exchangers are all typical anion exchangers, such as those available commercially, for example under the names Dowex® 1 or 11 or Amberlite® IRA.

Finally, the corrosion inhibitor can also be applied to a neutral carrier. Suitable carriers are, in particular, pulverulent extenders or pigments. This technique is described in greater detail in German Offenlegungsschrift No. 3,122,907.

In addition to the component (b), the coating composition can also contain another organic, metal-organic or inorganic corrosion inhibitor, for example salts of nitroisophthalic acid, tannin, phosphoric esters, technical amines, substituted benztriazoles or substituted phenols, such as are described in German Offenlegungsschrift No. 3,146,265.

The coating compositions according to the invention are preferably used as a primer on metallic substrates, in particular on iron, steel, copper and aluminium. Here they can function as so-called conversion coatings, in that chemical reactions take place at the interface between the metal and the coating. The application of the coatings can be effected by the customary methods, such as spraying, brushing, roller-coating, dipping or electrodeposition, in particular cathodic deposition. Depending on whether the film-former is a resin which dries physically or can be cured by heat or radiation, the curing of the coatings is carried out at room temperature, by stoving or by irradiation.

The corrosion inhibitors can be added to the coating composition during the preparation of the latter, for example during the distribution of the pigment by grinding or the inhibitors are dissolved beforehand in a solvent and the solution is stirred into the coating composition. The inhibitor is used in an amount of 0.1–20% by weight, preferably 0.5–5% by weight, based on the solids content of the coating composition.

The following examples describe the coating compositions according to the invention and their use in greater detail.

EXAMPLE 1

A primer composed of an aromatic epoxide resin, red iron oxide, talc and a polyaminoamide curing agent and containing the corrosion inhibitor indicated in the table is applied to sand-blasted steel sheet and cured for 1 week at room temperature. A white top lacquer composed of a two-component polyurethane is then applied and is also allowed to cure for one week. An X-shaped cut extending into the metal is scratched in the lacquered sample using a type 463 Sikkens knife. The sheets are then subjected to a salt spray test as specified in ASTM B 117 for a duration of 1,000 hours. The results are listed in Table 1.

| Corrosion inhibitor | Bubble formation | Sub-surface corrosion |
|---|---|---|
| none | severe | severe |
| 3% of compound 1 | a few bubbles | slight |
| 6% of compound 1 | no bubbles | none |

Compound 1 = benzthiazol-2-ylthiosuccinic acid.

EXAMPLE 2

A alkyd resin paint is prepared using the following formulation:
- 40 parts of Alphthalat ® AM 380 (60% solution in xylene), alkyd resin made by Reichhold Albert Chemie AG,
- 4 parts of iron oxide red 225 made by Bayer AG,
- 17.4 parts of talc (micronised),
- 13 parts of micronised calcium carbonate (Millicar ®, Plüss-Staufer AG),
- 0.3 part of skin prevention agent Luaktin ® (BASF),
- 0.6 part of 8% cobalt naphthenate solution and
- 24.7 parts of 6:40 xylene/ethylglycol mixture.

The corrosion inhibitors indicated in the tables which follow are previously dissolved in part of the solvent and are added to the paint. The paint is ground with glass beads for 7 days until a pigment and extender particle size of 15 μm is achieved.

The paint is sprayed onto sand-blasted steel sheets measuring 7×13 cm in a layer thickness of approx. 50 μm after drying. After drying at room temperature for 7 days, the samples are cured for 60 minutes at 60° C.

Two cross-shaped cuts 4 cm long are cut into the cured paint surface, until the metal is reached, using a Bonder cross-cut device. An edge protection agent (Icosit ® 255) is applied to the edges in order to protect them.

The samples are now subjected to a salt spray test as specified in ASTM B 117 for a duration of 600 hours. The condition of the coating is assessed after every 200 hours of weathering, specifically the degree of bubbling (as specified in DIN No. 53,209) at the cross-cut and on the painted surface and also the degree of rusting (as specified in DIN No. 53,210) on the entire surface.

At the end of the test, the coating is removed by treatment with concentrated sodium hydroxide solution, and the corrosion of the metal at the cross-cut (as specified in DIN No. 53,167) and also over the remainder of the surface is assessed. In every case the assessment is made on the basis of a 6-stage scale. The corrosion protection value CP is given by the sum of the assessment of the coating and the assessment of the metal surface. The higher this value, the more effective the inhibitor under test.

TABLE 2

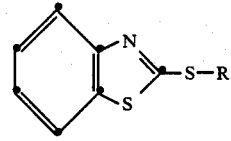

| R | Amount added | Assessment of coating | Assessment of metal | CP |
|---|---|---|---|---|
| —CH$_2$—COOH | 1% | 4.6 | 2.7 | 7.3 |
| | 3% | 2.0 | 0.6 | 2.6 |
| —CH$_2$—CH$_2$—COOH | 1% | 4.6 | 4.5 | 9.1 |
| | 3% | 3.0 | 2.7 | 5.7 |
| —(CH$_2$)$_5$—COOH | 1% | 4.4 | 2.7 | 7.1 |
| | 3% | 4.4 | 2.7 | 7.1 |
| —(CH$_2$)$_{10}$—COOH | 1% | 4.4 | 2.0 | 6.4 |
| | 3% | 4.3 | 1.7 | 6.0 |

TABLE 2-continued

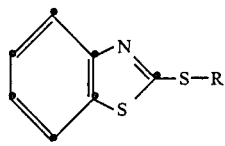

| R | Amount added | Assessment of coating | Assessment of metal | CP |
|---|---|---|---|---|
| $\begin{array}{c}\text{CH}_3\\|\\-\text{CH}-\text{CH}_2-\text{COOH}\end{array}$ | 1%<br>3% | 3.2<br>3.2 | 1.5<br>1.5 | 4.7<br>4.7 |
| $\begin{array}{c}\text{CH}_3\\|\\-\text{CH}_2-\text{CH}-\text{COOH}\end{array}$ | 1%<br>3% | 2.9<br>2.3 | 1.3<br>1.2 | 4.2<br>3.5 |
| $\begin{array}{c}\text{COOH}\\|\\-\text{CH}-\text{CH}_2-\text{COOH}\end{array}$ | 0,5%<br>1%<br>2%<br>3% | 5.4<br>4.4<br>2.8 | 2.8<br>0.6<br>1.0 | 8.2<br>5.0<br>3.8<br>4 |
| Zn salt thereof | 1%<br>3% | 5.7<br>5.1 | 0.6<br>0.6 | 6.3<br>5.7 |
| $\begin{array}{c}\text{COOH}\\|\\-\text{CH}_2-\text{CH}-\text{CH}_2-\text{COOH}\end{array}$ | 1%<br>3% | 5.5<br>4.5 | 5.5<br>3.5 | 11<br>8 |
| $\begin{array}{c}\text{COOH}\\|\\-\text{CH}_2-\text{CH}-\text{CH}_2-\text{CH}_2-\text{COOH}\end{array}$ | 1%<br>3% | 3.2<br>2.8 | 0.6<br>0.6 | 3.8<br>3.4 |
| $\begin{array}{c}\text{COOH}\\|\\-\text{C}=\text{CH}-\text{COOH}\end{array}$ | 1%<br>3% | 3.6<br>4.0 | 0.6<br>0.6 | 4.2<br>4.6 |
| no inhibitor | | 1.9 | 0.6 | 2.5 |

EXAMPLE 3

This is carried out as in Example 2. The inhibitors and basic additives indicated in the following table are added to the base formulation. The effectiveness is assessed as in Example 2 by quoting the corrosion protection value CP.

TABLE 3

| Corrosion inhibitor | CP |
|---|---|
| 2% of compound 2 | 7.3 |
| 10% of zinc oxide | 7.0 |
| 2% of compound 2 + 10% of ZnO | 10.1 |
| 2% of compound 2 | 7.3 |
| 10% of zinc carbonate | 3.4 |
| 2% of compound 2 + 10% of ZnCO$_3$ | 10.1 |
| 2% of compound 2 | 7.3 |
| 10% of zinc phosphate | 7.7 |
| 2% of compound 2 + 10% of Zn phosphate | 9.9 |
| 2% of compound 2 | 7.3 |
| 10% of basic pigment A | 4.1 |
| 2% of compound 2 + 10% of pigment A | 11.3 |

Compound 2 = 3-(benzthiazol-2-ylthio)-propane-1,2-dicarboxylic acid
Pigment A = Chromophthalrot ® A$_2$B (Ciba-Geigy AG)

EXAMPLE 4

A primer composed of a grey acrylic resin paint is applied to phosphatised iron sheet and is allowed to dry at room temperature for 60 minutes. An X-shaped cut is scratched in the painted surface. The samples are subjected to a salt spray test lasting 500 hours and are then assessed visually.

| Inhibitor | Assessment |
|---|---|
| none | severe corrosion |
| 2% of compound 1 | no corrosion |
| 2% of Ca salt thereof | no corrosion |
| 2% of Zn salt thereof | slight corrosion at the cut |

EXAMPLE 5

A water-based maintenance primer is prepared by mixing the following components (A) and (B)

(A) Pigment Paste

| | |
|---|---|
| 14.6 g | Tio$_2$-Pigment (Ti-Pure ® R-960, Du Pont de Nemours Co) |
| 1.4 g | 35% aqueous solution of an dispersing agent (Dispersing Agent QR 681 M, Rohm & Haas) |
| 0.2 g | pigment wetting agent (Triton ® CF 10, Rohm & Haas) |
| 4.7 g | dist. water |
| 0.2 g | antifoaming agent (colloids 643, Colloids Inc.) |
| 1.2 g | zinc oxide |
| 5.1 g | micronized CaCO$_3$ (Millicarb ®, Pluss-Staufer) |
| 27.4 g | |

(B) Binder Dispersion

| | |
|---|---|
| 64.4 g | 43% aqueous dispersion of an acrylic resin (Primal ® MV 23, Rohm & Haas) |
| 1.0 g | 2-butoxyethoxy-ethanol |
| 2.7 g | ethylene glycol |
| 0.2 g | milewcide agent (Skane ® M-8, Rohm & Haas) |
| 0.4 g | antifoaming agent (Colloids 643, Colloids Inc.) |
| 0.2 g | Thickener (Primal ® ICS-1, Rohm & Haas) |

-continued

| 1.1 g | rheology modifier (Primal ® RM-8, Rohm & Haas) |
| 2.6 g | dist. water |
| 72.6 g | |

The mixed primer has a solid content of 48%. To this dispersion are added 2.4 g of 3-(benzothiazol-2-yl)-propan-1,2-dicarboxylic acid (compound 2) which previously is dissolved in aqueous ammonia. This corresponds to 5% per weight of the solid paint.

The primer is applied to phosphatised tron sheets in a thickness of 100 μm. The samples are baked at 130° C. for 20 minutes and are afterwards tested and assessed in the same way as the samples of Example 2.

| Assessment of coating | 4.4 |
| Assessment of the metal | 4.5 |
| CP | 8.9 |

What is claimed is:

1. In a corrosion-inhibiting coating composition containing
(a) a resinous film-forming binder and (b) a corrosion inhibitor, the improvement comprising, as the corrosion inhibitor (b), an effective amount of an aliphatic or cycloaliphatic mono-, di-, tri- or tetracarboxylic acid which is substituted in its aliphatic or cycloaliphatic radical by at least one group of the formula I

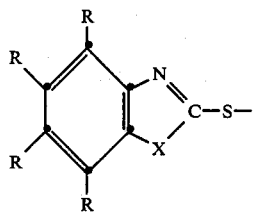

in which X is oxygen, sulfur or NH and each R independently of the others is hydrogen, alkyl, halogenoalkyl, alkoxy, alkylthio, alkylsulfonyl, cycloalkyl, phenyl, alkylphenyl, phenylalkyl, halogen, —CN, —NO$_2$, —COOH, —COOalkyl, —OH or a primary, secondary or tertiary amino or carbamoyl group, R not being —NH$_2$ in the case of a monocarboxylic acid in which X is sulfur, and base addition salts of said compounds.

2. A coating composition according to claim 1, wherein x of the formula is sulfur.

3. A coating composition according to claim 1, wherein one of the substituents R is hydrogen, C$_1$–C$_4$-alkyl, C$_1$–C$_4$-alkoxy or an amino group and the other three Rs are hydrogen.

4. A coating composition according to claim 1, wherein each R is hydrogen.

5. A coating composition according to claim 1, in which the component (b) is a monocarboxylic or dicarboxylic acid or a salt thereof.

6. A coating composition according to claim 1, in which the component (b) contains a group of the formula I which is in the beta-position relative to a carboxyl group.

7. A coating composition according to claim 1, containing, as the component (b), a compound of the formula II

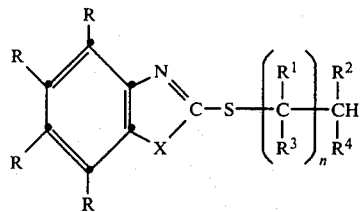

in which X and R are as defined in claim 1, n is zero or 1and R$^1$, R$^2$, R$^3$ and R$^4$ independently of one another are hydrogen, alkyl, hydroxyalkyl, halogenoalkyl, alkoxyalkyl, carboxyalkyl, carboxyl or phenyl or phenylalkyl which is unsubstituted or monosubstituted or disubstituted, or R$^1$ and R$^2$ or R$^1$ and R$^3$ together are linear alkylene which can be substituted by 1 or 2 —COOH groups, or R$^1$ and R$^2$ together are a direct bond, at least one of the substituents R$^1$, R$^2$, R$^3$ and R$^4$ being a carboxyl or carboxyalkyl group, and base addition salts of said compounds.

8. A coating composition according to claim 7, wherein n is 1.

9. A coating composition according to claim 7, wherein R$^1$, R$^2$, R$^3$ and R$^4$ are hydrogen, C$_1$–C$_{18}$-alkyl, C$_2$–C$_{12}$-carboxyalkyl, carboxyl, phenyl or benzyl, or R$^1$ and R$^2$ together are trimethylene or tetramethylene which may be substituted by C$_1$–C$_4$-alkyl or by 1 or 2 carboxyl groups.

10. A coating composition according to claim 7, wherein R$^1$, R$^2$, R$^3$ and R$^4$ in formula II independently of one another are hydrogen, C$_1$–C$_4$-alkyl, carboxyl or C$_2$–C$_6$-carboxyalkyl.

11. A coating composition according to claim 7, wherein at least two of the substituents R$^1$, R$^2$, R$^3$ and R$^4$ in formula II are a carboxyl or carboxyalkyl group.

12. A coating composition according to claim 1, in which the component (b) is a compound of the formula

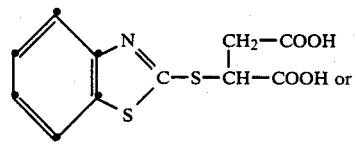

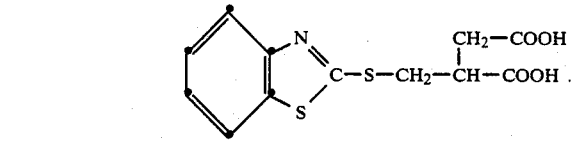

13. A coating composition according to claim 1, in which the component (b) is a compound of the formula

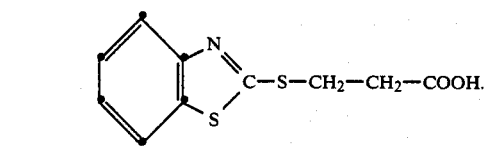

14. A coating composition according to claim 1, in which the component (b) is present as the salt of an alkali metal or alkaline earth metal or a metal of group IIB, IIIA or VIII of the periodic system of the elements, as an ammonium salt or as the salt of an organic amine.

15. A coating composition according to claim 14, in which the component (b) is present as a sodium, potassium, anmonium, calcium, magnesium, zinc or aluminium salt or as the salt of a primary, secondary or tertiary amine.

16. A coating composition according to claim 1, containing, as the film-former (a), an epoxide resin, polyurethane resin, aminoplast resin, acrylic resin, polyester resin or alkyd resin or a mixture of such resins.

17. A coating composition according to claim 16, in which the film-former is an epoxide resin based on an aromatic polyol.

18. A coating composition according to claim 1, wherein the film-former is present as aqueous solution or dispersion.

19. A coating composition according to claim 1, containing 0.1 to 20% by weight of the component (b), based on the solids content of the coating composition.

20. A coating composition according to claim 1, containing 0.5 to 5% by weight of the component (b).

21. A process for preventing corrosion of an iron, steel, copper or aluminum metallic substrate which comprises applying a composition according to claim 1 to the surface of said metal substrate as a primer thereon.

22. The process of claim 21 wherein said composition is an electrocoating paint for cathodic electrodeposition.

* * * * *